Dec. 10, 1946.  J. A. KAVANAGH  2,412,516
REGISTRATION INDICATOR SYSTEM
Filed Nov. 21, 1944  2 Sheets-Sheet 1
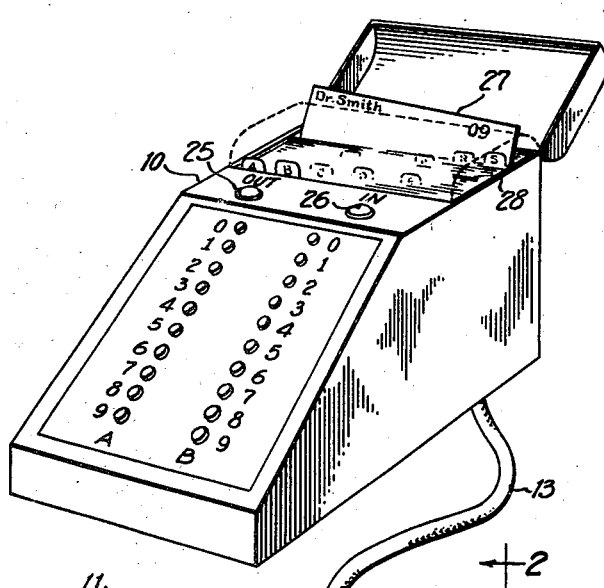
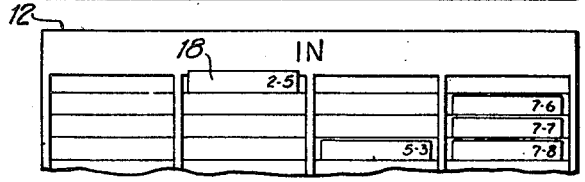
INVENTOR
JOSEPH A. KAVANAGH
BY
W. M. Wilson
ATTORNEY Dec. 10, 1946.    J. A. KAVANAGH    2,412,516
REGISTRATION INDICATOR SYSTEM
Filed Nov. 21, 1944    2 Sheets-Sheet 2
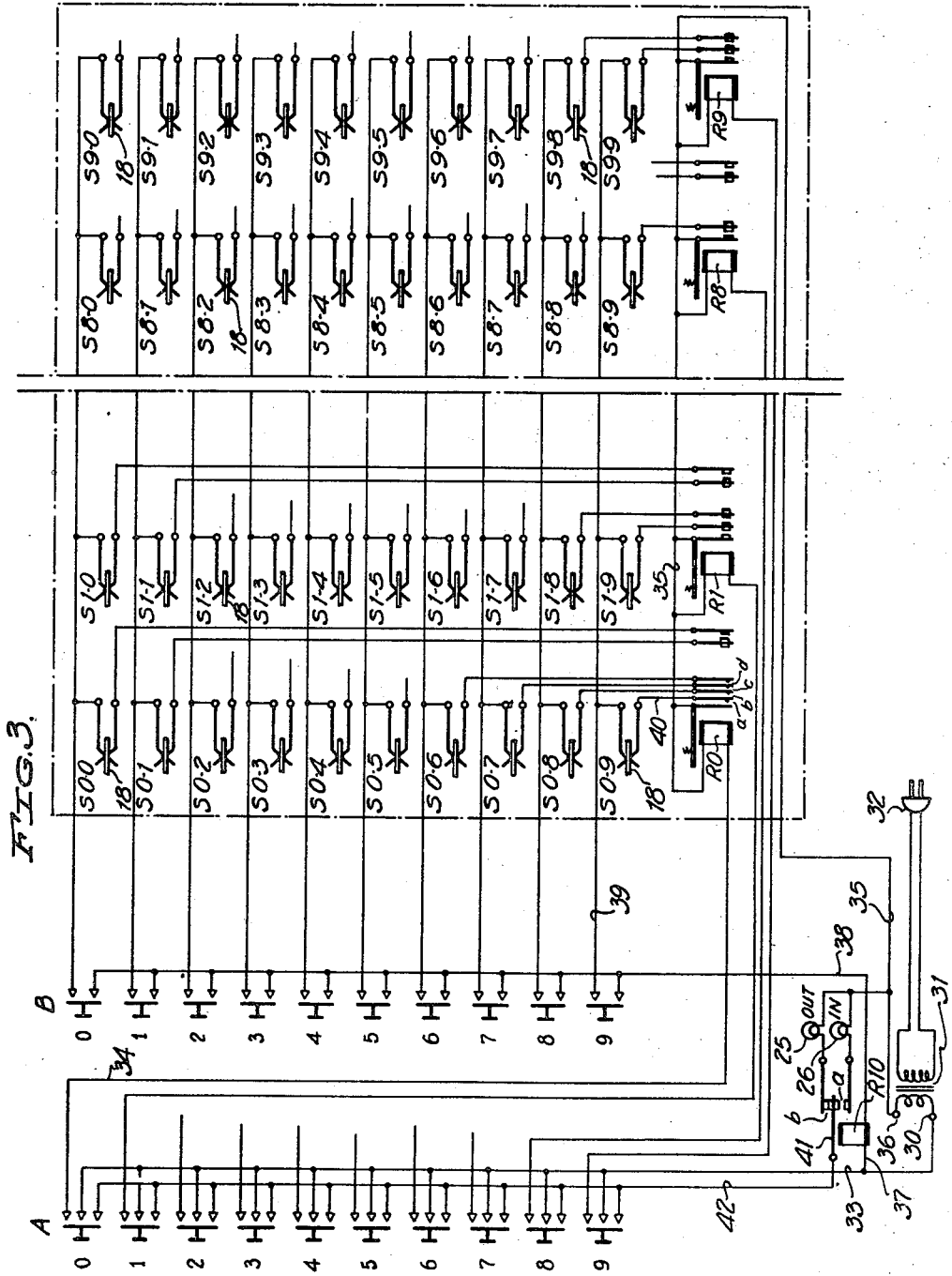
INVENTOR
JOSEPH A. KAVANAGH
BY
ATTORNEY Patented Dec. 10, 1946

2,412,516

UNITED STATES PATENT OFFICE 2,412,516

REGISTRATION INDICATOR SYSTEM

Joseph A. Kavanagh, New York, N. Y., assignor to International Business Machines Corporation, New York, N. Y., a corporation of New York Application November 21, 1944, Serial No. 564,523

2 Claims. (Cl. 177—353)

This invention relates to an "in" and "out" registration system for institutions or businesses where attendance is irregular. For example, the system may be used in hospitals for indicating what doctors are in the hospital at any particular time.

One object is to provide a system of the kind described whereby an operator, for example the telephone switchboard operator, can determine instantly whether a particular person is in or out.

Another object is to provide a system of the kind referred to which is simple and economical to install and to operate.

Another object is to provide a system by means of which a large number of individual registration switches can be selectively tested simply by simultaneously operating two selected switches in two different, relatively small groups.

Another object is to provide an "in" and "out" registration system comprising registration switches which can be controlled automatically by the insertion of individual cards into related pockets in a card rack. Thereby, the registration system can be associated with a card time recording system, the registration switches being automatically controlled as the cards are moved into or out of one of the card racks.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an assembly view of the system.

Fig. 2 is a section on the line 2—2 of Fig. 1.

Fig. 3 is a circuit diagram.

The registration system comprises an operator's switch box 10 and a registration panel 11, as well as a relay box which does not appear in the drawings, all interconnected by wires in a cable 13. In the preferred embodiment shown, the registration panel is embodied in the "out" card rack of a card time recording system, the latter also including an "in" card rack 12, and a card time recorder, not shown in the drawings. In such time recording systems each person, on checking in, removes his individual card from its pocket in the "out" card rack, inserts it in the time recorder to stamp the time on it, then inserts it in its pocket in the "in" card rack. On checking out the procedure is reversed.

The card racks comprise upright frame members 15 and partitions 16 therebetween, forming card pockets 17 to receive the individual cards 18. The "out" card rack has mounted on the back of it normally closed registration switches S, one for each card pocket. Each partition has a slot 20 at the back of the related pocket, in which is a flexible tongue 21, anchored near its upper end at 22 to the partition and bent forward, as shown at 23, so that when a card is inserted in the pocket the tongue 21 will be forced back and its lower end will lift the contact spring 24, to open the normally closed contacts S. The card racks, in this case are provided with one hundred pockets, twenty-five in each vertical row. The different switches S and their operators are laterally staggered, to avoid interference due to their vertical overlap.

The operator's switch box 10 is provided with two rows of push button switches A and B, the buttons of each row being numbered, respectively 0, 1 . . . 8, 9. The 100 cards 18, and their related pockets, are numbered from 00 to 99, respectively, and, by pressing the proper pair of buttons in the two rows, the operator can identify any individual card pocket, to test the condition of its switch S. The switch box 10 has an "out" lamp 25 and an "in" lamp 26, which, by means of circuits to be described presently indicate the condition of a particular registration switch S, when the corresponding pair of push button switches are closed.

Operation

The operation of the system will now be described by reference to a particular example. Suppose the operator to have a call for Dr. Smith. An examination of Dr. Smith's card 27, in a card file 28, conveniently located in the switch box 10, shows the registration number of Dr. Smith to be 09. The operator presses the 0 button in the A column and the 9 button in the B column. If Dr. Smith has checked in, that is, has moved his card 18 from the "out" rack to the "in" rack, the related switch S will be closed and the following circuits will be completed: from the lower terminal 30 of a transformer 31 (connected by a plug 32 to the power supply), one circuit extends through wire 33, the middle contact of the 0 switch of row A to the upper contact of said switch, thence, through wire 34, relay coil R0, wire 35, to the upper terminal 36 of the transformer 31, energizing the group relay R0 and causing all its contacts to be connected to the wire 35.

The second circuit extends from the lower terminal 30 of the transformer, through wires 33 and 37, indicator relay coil R10, wire 38, the contacts of switch 9 of row B, main branch wire 39, registration contacts S09, sub-branch wire 40, contacts a of relay R0, and wire 35, to the upper terminal 36 of the transformer, energizing the indicator relay coil R10 and causing the contact spring 41 thereof to transfer to lower position.

A third circuit extends from the lower terminal 30 of the transformer, through wire 33, the middle and lower contacts of switch 9 of the A row, wire 42, the a contacts of relay R10, the "in" lamp 26, to wire 35 and the upper terminal 36 of the transformer 31, illuminating said lamp showing that Dr. Smith has checked in.

If Dr. Smith had not been checked in, the contacts would have been open and the relay R10 would not have been energized. Therefore, the lamp circuit would have extended from wire 42 through the b contacts of relay R10, the "out" lamp 25, to wire 35 and the upper terminal 36 of the transformer, illuminating said lamp and showing that Dr. Smith had not checked in.

In a similar way any other registration switch S00 to S99 can be tested and the signal lamps 25 or 26 will show whether the doctor to whom any registration switch pertains is out or in.

While there have been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an annunciator system for indicating "in" and "out" registration of a number of people individually identified by different combinations of digits selected from two groups, an operator station comprising a set of first digit switches and a set of second digit switches, a set of group relays including one relay for each first digit switch, each of said group relays having normally open contacts, one for each second digit switch, which are closed when the relay is energized, an indicator relay having normally open contacts adapted to be closed when the indicator relay is energized, a registration panel comprising a number of normally open registration switches, one for each different combination of digits, energizing circuit means for the coil of said indicator relay including a number of main branch circuits each including a different one of said second digit switches, and a number of sub-branch circuits in series with each main branch circuit, each sub-branch circuit including a different one of said registration switches and an individual one of said group relay contacts, and an indicator circuit including indicating means and said indicator relay contacts, said indicator circuit also including a number of branches, one for each digit of one of said sets, each branch including normally open contacts adapted to be closed by the related switch of said last mentioned set.

2. In an annunciator system for indicating "in" and "out" registration of a number of people individually identified by different combinations of digits selected from two groups, an operator station comprising a set of first digit switches and a set of second digit switches, a set of group relays including one relay for each first digit switch, each of said group relays having normally open contacts, one for each second digit switch, which are closed when the relay is energized, an indicator relay having normally open contacts and normally closed contacts, a registration panel comprising a number of normally open registration switches, one for each different combination of digits, energizing circuit means for the coil of said indicator relay including a number of main branch circuits, each including a different one of said second digit switches, and a number of sub-branch circuits in series with each main branch circuit, each sub-branch circuit including a different one of said registration switches and an individual one of said group relay contacts, an indicator circuit including an "in" branch and an "out" branch, said branches including "in" and "out" indicating means, respectively, said "in" branch including the normally open contacts of said indicator relay while said "out" branch includes the normally closed contacts of said indicator relay, said indicator circuit also including a common conductor, and means operated by any switch of one of said sets of digit switches for connecting said common conductor to a source of current.

JOSEPH A. KAVANAGH.